(No Model.)
H. M. CRYER.
POST HOLE AUGER.
No. 472,339. Patented Apr. 5, 1892.
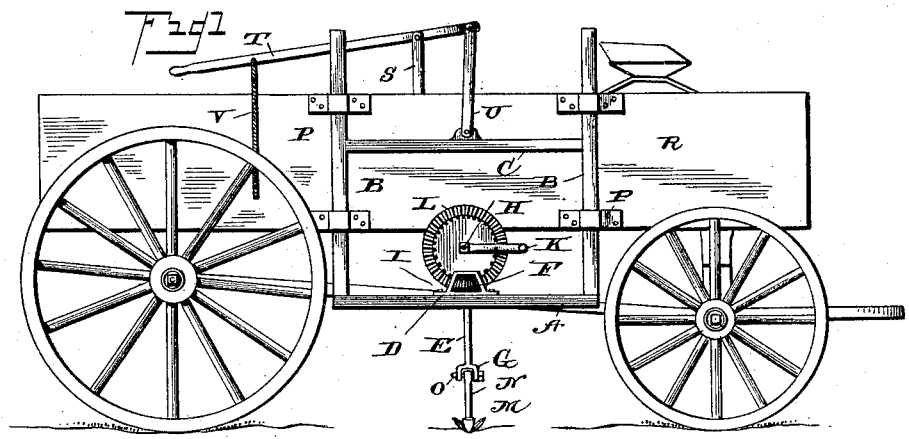
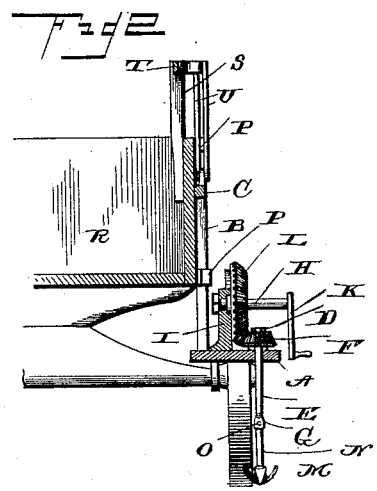
Witnesses
Inventor
Henry M. Cryer,
By his Attorney

UNITED STATES PATENT OFFICE.

HENRY M. CRYER, OF GOLDTHWAITE, TEXAS.

POST-HOLE AUGER.

SPECIFICATION forming part of Letters Patent No. 472,339, dated April 5, 1892.

Application filed January 7, 1891. Serial No. 377,020. (No model.)

*To all whom it may concern:*

Be it known that I, HENRY M. CRYER, a citizen of the United States, residing at Goldthwaite, in the county of Mills and State of Texas, have invented certain new and useful Improvements in Post-Hole Augers; and I do hereby declare that the following is a full, clear, and exact description of the invention, which will enable others skilled in the art to which it appertains to make and use the same.

My invention relates to post-hole augers; and the object of my invention is to provide a cheap, simple, and efficient machine which is adapted to be attached to a cart or wagon and moved from place to place thereon in line with the proposed fence and operated to bore post-holes without the necessity of detaching it from the wagon, whereby the machine may be readily transported and arranged in position for use.

In the accompanying drawings, which illustrate my invention, Figure 1 is a side elevation of my improved post-hole auger, showing the same attached to a wagon-bed and in operative position. Fig. 2 is a vertical transverse sectional view of the same.

A represents a beam of suitable size and length, which is provided at its ends with vertical standards B. These standards are connected at a suitable distance above the beam by a bar C. The standards, beam, and bar constitute the frame-work of the auger. An opening is made in the center of the beam, and on the latter, above the opening, is bolted a bearing knee or frame D, in which is journaled the upper end of a vertical shaft E, having a beveled pinion F at its upper end and having its lower end provided with the fork G.

A shaft H is mounted in a bearing-block I, bolted on the beam A, and this shaft has a crank K, by which it may be turned, and a cog-wheel L, which meshes with the pinion on the vertical shaft.

M represents the post-hole auger, having the shaft N, the upper end of which is received in the fork G of the shaft E and is pivotally jointed thereto by means of a pin O, which extends through aligned openings in the fork G of the shaft E and in the upper end of the shaft N.

The standards B operate in guides P, secured to one side of the box or bed of a cart or wagon R, and also attached to the latter is a vertical standard S, to the upper end of which is pivoted a lever T. Links U connect the shorter end of the lever to the center of the bar C, and to the long end of the lever is attached a cord or chain V, which depends therefrom and is within easy reach of a person stationed at the crank.

The operation of the invention is as follows: The wagon is driven along the proposed fence-line and is stopped where it is desired to bore a post-hole. The operator then with one hand operates the lever to lower the auger and with the other hand he turns the crank, thereby imparting rotary motion to the auger and causing it to bore a hole in the ground. Having finished boring the post-hole, the auger and its frame are raised bodily by means of the lever until the auger clears the ground, and the wagon is then driven a suitable distance forward and another post-hole bored, as before. When it is desired to remove the auger apparatus from the vehicle, the bar C is first detached from the standards B and the latter are permitted to slide from the guides P, when the auger is thrown up to a horizontal position. To effect this result, the bar C is secured to the standards B by bolts or in other suitable manner, so that when the device is to be removed from the vehicle the bolts or other securing means are disengaged from the bar C, permitting the removal of the latter. If preferred, however, the guides P may be made detachable in lieu of the bar C by the removal of their securing-bolts. In practice the standards B are of approximately a length corresponding to the distance between the lower guides P and the ground, so that when the auger is thrown up to a horizontal position the standards can be lowered until disengaged from the guides. When the frame has been detached, the lever T is also removed from the vehicle.

It will be readily seen that one man is sufficient to operate the machine and that it may be quickly connected to or disconnected from an ordinary farm-wagon. By jointing the auger E said auger when withdrawn from the ground can be swung to one side to deposit the earth away from the hole bored.

Owing to the simplicity of the device it is adapted to be supported at one side of the vehicle, all of the parts being thus within convenient location to the operator.

The pin which serves to pivotally connect the auger-shaft to the vertical shaft may be removed when it is desired to detach the auger.

Having thus described my invention, I claim and desire to secure by Letters Patent of the United States—

1. The combination, with a wagon having brackets secured to one side thereof, of a vertically-sliding frame moving within said brackets and carrying an earth-auger and gearing for actuating said auger, substantially as described.

2. The combination, with a wagon having brackets secured to one side thereof, of a vertically-sliding frame moving within and detachable from said brackets and carrying an earth-auger, the shaft of which is pivotally jointed, gearing for actuating said auger mounted within said frame, and a lever for raising or lowering the frame, substantially as shown and described.

In testimony whereof I affix my signature in presence of two witnesses.

HENRY M. CRYER.

Witnesses:
H. S. THOMAS,
J. B. APPLEWHITE.